United States Patent [19]

Sigman

[11] Patent Number: 4,650,219

[45] Date of Patent: Mar. 17, 1987

[54] CHILD I.D. SYSTEM

[76] Inventor: Malcolm Sigman, 3001 S. San Pedro St., Los Angeles, Calif. 90011

[21] Appl. No.: 723,213

[22] Filed: Apr. 15, 1985

[51] Int. Cl.[4] .......................... G09C 5/00; G06K 3/02; G09F 21/02

[52] U.S. Cl. ........................................ 283/70; 283/74; 40/586

[58] Field of Search ................ 283/70, 74, 81; 40/1.5, 40/2 R, 10 R, 586, 2.2; 33/174; 101/368

[56] References Cited

U.S. PATENT DOCUMENTS

| | | | |
|---|---|---|---|
| 601,869 | 4/1898 | Busch . | |
| 726,739 | 4/1903 | O'Loughlin et al. . | |
| 1,460,282 | 6/1923 | Shill | 283/74 |
| 2,041,628 | 5/1936 | Tillett . | |
| 3,736,006 | 5/1973 | Polsky . | |
| 3,921,318 | 11/1975 | Calavetta . | |
| 4,168,586 | 9/1979 | Sandis | 283/70 |
| 4,239,261 | 2/1980 | Richardson . | |
| 4,336,754 | 6/1982 | Loeb | 283/74 |
| 4,338,737 | 7/1982 | Lehman | 283/70 |
| 4,375,133 | 3/1983 | Fenaich et al. | 40/586 |
| 4,423,415 | 12/1983 | Goldman | 283/74 |

*Primary Examiner*—Paul A. Bell
*Assistant Examiner*—Paul M. Heyrana, Sr.
*Attorney, Agent, or Firm*—Freilich, Hornbaker, Rosen & Fernandez

[57] ABSTRACT

A system is described that facilitates notification of the parents of a lost child, while preventing strangers from learning the name of the child or parents. The system includes an alphanumeric identification marking (I.D. marking) on an item of clothing of a particular child, the I.D. marking being unique to the particular child but not containing the child's name. An alert marking, similar to alert markings on other children's clothing that have an I.D. marking, alerts authorities who find a lost child that an I.D. marking is present and indicates where it is located, such as hidden within a pocket. Authorities finding the child, and by the alert marking are directed to the I.D. marking, are able to contact a central station which can notify the parents of the child that the child has been found. The I.D. marking can be generated from a credit card number of a parent by a formula that permits knowledge of the I.D. marking to be used to generate enough of the credit card number of the parent to identify him or her.

2 Claims, 8 Drawing Figures

FIG. 1
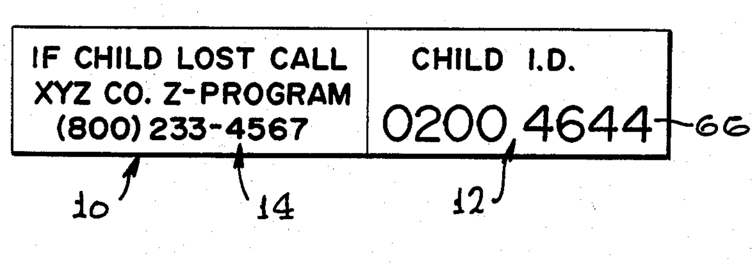
FIG. 2
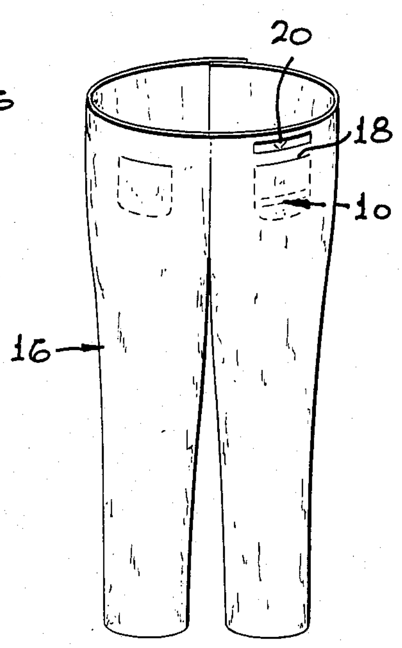
FIG. 3
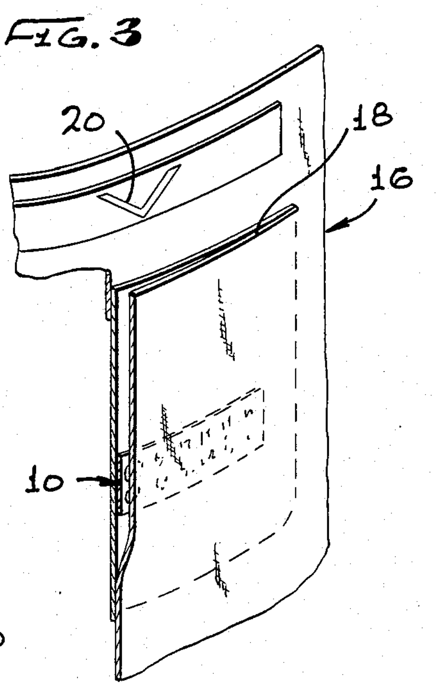
FIG. 7
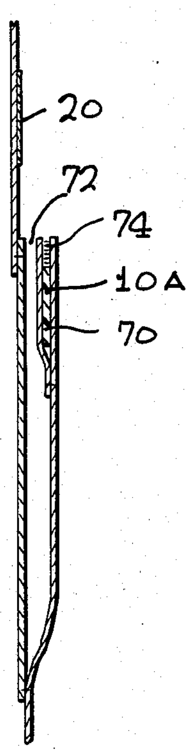
FIG. 4
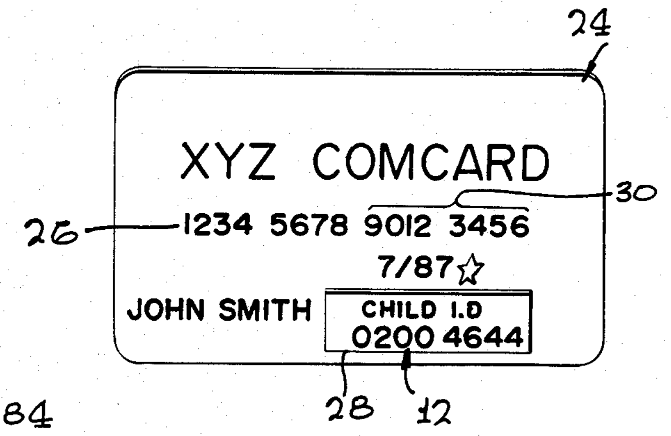
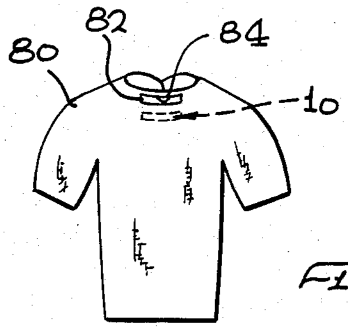
FIG. 8

CHILD I.D. SYSTEM

BACKGROUND OF THE INVENTION

There is a great need for a system that facilitates identification of lost children and the notification of their parents. The most direct approach would be to simply write the name of the child or the parents and the telephone number of the parents on a tag and sew the tag into the child's clothing. However, this would have several disadvantages. One disadvantage is that since very few parents sew such a tag into their child's clothing, it might take sometime before authorities would look and find such a tag, especially in the case of very young children. Another disadvantage is that strangers could readily find the name of the child and the telephone number of his parents, and do harm to either or both of them. The system which facilitated the prompt identification of lost children would be of considerable value.

SUMMARY OF THE INVENTION

In accordance with one embodiment of the present invention, a system is provided that aids in the identification of lost children. The system includes an alphanumeric identification marking, or I.D. marking located on a child's item of clothing. The I.D. marking is unique to that child but is devoid of his name and home telephone number. However, the marking indicates a party to be telephoned who has information about the child and parents corresponding to a particular I.D. marking. The I.D. marking can be located in a hidden place where it is protected from damage and the curiosity of others, but the item of clothing can include an alert marking that alerts authorities who find a lost child, that there is such an I.D. marking on that item of clothing, the alert marking being the same for all items of clothing having an identification marking. The alphanumeric I.D. marking can be generated from the credit card number of a parent, by a mathematical formula that permits a central station to convert the child's I.D. number into a sufficient portion of the parent's credit card number to enable identification of the parents.

The novel features of the invention are set forth with particularity in the appended claims. The invention will be best understood from the following description when read in conjunction with the accompanying drawings.

BRIEF DESCRIPTION OF THE DRAWINGS

FIG. 1 is a side elevation view of a tag in accordance with the present invention, which is useful on an item of children's clothing.

FIG. 2 is a perspective view of a pair of children's pants on which the tag of FIG. 1 is mounted.

FIG. 3 is a partial and perspective sectional view of the pants of FIG. 2.

FIG. 4 is a perspective view of a credit card whose owner can be identified from the tag of FIG. 1 and which can be used in generating and I.D. marking of the tag.

FIG. 7 is a partial sectional view of a pair of children's pants constructed in accordance with another embodiment of the invention, containing another tag of the invention.

FIG. 8 is a partial perspective view of a child's shirt containing the tag of FIG. 1.

DESCRIPTION OF THE PREFERRED EMBODIMENTS

Figure 5:
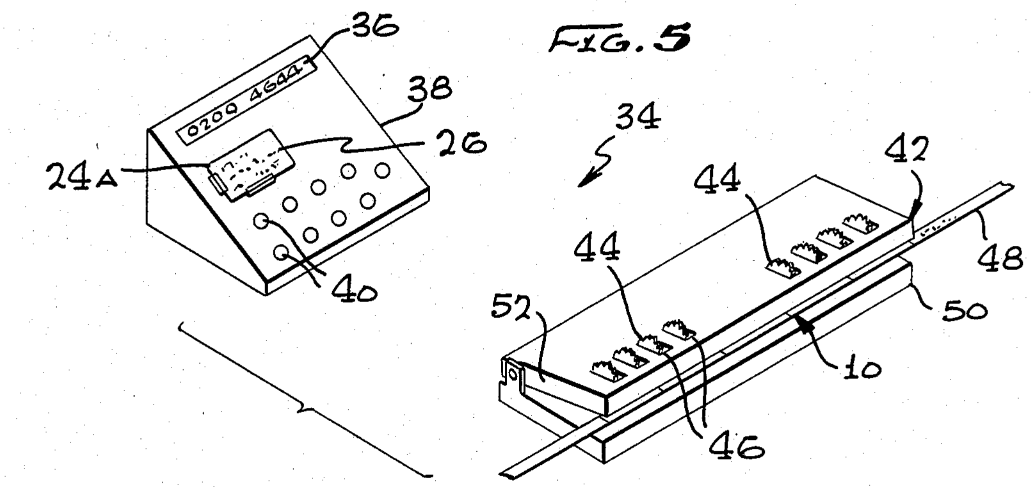
FIG. 5 is a partial perspective view of a system which can be used in the generation of the tag of FIG. 1.

FIG. 1 illustrates a tag 10 which can aid in locating the parents (or other guardian) of a child who is lost, which may be a young child who has wandered away from his parents or a somewhat older child who has been injured. The tag 10 includes an alphanumeric identification marking 12 which is unique to that particular child (herein the term "unique to a child" means unique to one or more children of a particular parent or other guardian). However, the alphanumeric identification marking, or I.D. marking, has no easily observed relationship to the name of the child or his parents. The tag also includes a telephone number 14 which can be called to reach a central station which can use the I.D. marking 12 to determine the name and telephone number of the parents so they can be notified as to where their child has been found.

FIGS. 2 and 3 illustrate one way in which the tag 10 can be place on an item of clothing 16 such as a pair of pants of the child. The tag has adhesive on it and is attached to the inside of a back pocket of the pair of pants. Although the tag is hidden, an alert marking 20 is provided, which serves to alert someone who finds a child that there is an I.D. marking on the clothing which can be used to notify the parents of the child, and which also indicates where the I.D. marking is located. The marking 20 is preferably located on the same side of the clothing (e.g. the back, rather than either the left or right side or the front) as the tag 10 with the I.D. marking, and preferably includes an arrow means such as the "V" 20 which points to the particular location of a I.D. marking which is here on a tag.

The tag 10 is preferably hidden on the clothing so that children do not notice it and do not play with it or try to remove it. However, since most items of clothing do not contain any such tag, it is quite possible for someone finding a lost child to neglect to look for such a tag. The alert marking 20 can indicate that there is such a tag and where it is located, especially, if there is a public notification as through advertising, that such an alert marking is used with an I.D. marking tab.

It would be possible to place the name of the child or his parents on a tag together with their phone number, and to place such a tag on a child's item of clothing. However, this would enable strangers to learn the name of a child and/or his parents and their telephone number, which could be used for illegal purposes in burglarizing the parent's home or even demanding a ransom. The use of an I.D. 12 which does not have an easily observed relationship to the name of the child, together with a telephone number 14 which is not that of the parents but only of a center which can notify the parents, avoids many potential problems.

FIG. 4 illustrates a credit card 24 which may be issued by a variety of firms, and especially by a company whose stores sell children's clothing. The credit card has a credit card number 26 which, among other things, includes a portion that identifies the particular holder of the credit cad. A label 28 has been attached to this particular credit card which contains the I.D. marking 12, of a child of the card holder. The credit card number 26 and the I.D. marking 12 are related, in that the credit card number 26 can be used to generate the I.D. marking 12, while the I.D. marking 12 can be used to identify the holder of the credit card. In this particular example, it is assumed that the last eight digits 30 of the credit card number are sufficient to identify the particular holder of the credit card.

FIG. 5 illustrates an apparatus 34 which can be used in a children's clothing store to produce the alphanumeric I.D. characters or number 36 of an I.D. marking for a particular child. A programmed calculator 38 can hold a credit card 24A. An operator enters the credit card number on a keyboard 40, and the calculator produces the I.D. number 36. A printing device 42 at the store has thumb wheels 44 that can be turned until the digits of the I.D. number 36 are shown through windows 46. With a strip 48 of tags on a platen 50, the upper printer 52 is depressed to print the I.D. number on a particular tag. Additional printings can be made, and one of the tags can be cut to leave only the portion containing the I.D. number which is used as the label 28 for placing on the credit card 24A for future reference. One or more other tags 10 can be used for placement on one or more items of children's clothing.

Figure 6:
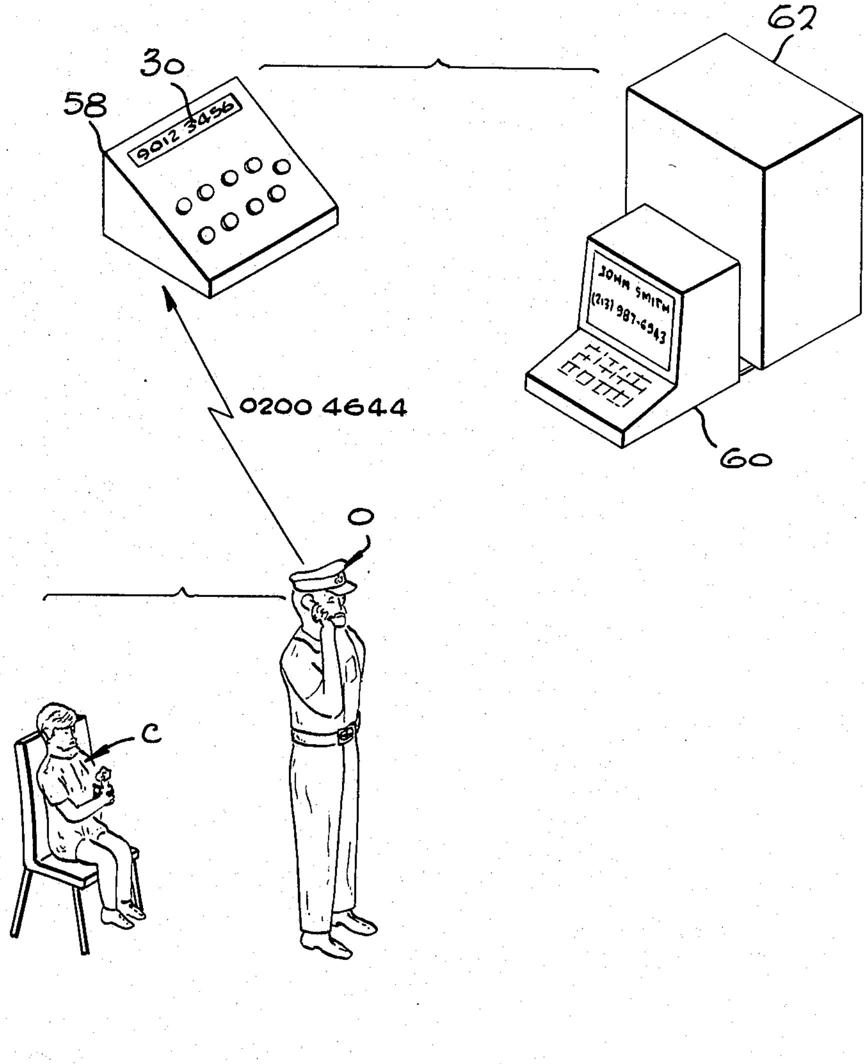
FIG. 6 is a partial perspective view of a system which can be used to identify the owner of the credit card of FIG. 4 from the tag of FIG. 1.

FIG. 6 illustrates an example of a situation where a child C is lost, and is found by a police officer O who discovers an I.D. tag on the child's clothing. The police officer phones the telephone number 14 on the tag to reach a central station 56. The officer reads the I.D. marking 12 on the child's tag and repeats it to an operator at the central station. The operator enters the I.D. number of the I.D. marking into a programmed calculator 58. The calculator displays at 30, the portion of the credit card number which can be used to identify the particular card holder. This portion 30 of the credit card number is entered into a computer 60 connected to a memory bank 62 which stores information about numerous credit card holders, including their home and work telephone numbers. The operator can then call the parent and inform the parent where his or her child has been found. Since the computer 60 and memory bank 62 are used anyway for conducting a credit card business, only a moderate additional expense is required to allow the central station 56 to not only authorize credit card purchases but to also help parents locate lost children.

The I.D. number 66 of the I.D. marking can be generated from the credit card number 26 (FIG. 4) in a wide variety of ways. One example is to add different amounts to each of the eight digits 30 of the credit card number portion 30 as follows:

| | | | | | | | | |
|---|---|---|---|---|---|---|---|---|
| credit card no. | 9 | 0 | 1 | 2 | 3 | 4 | 5 | 6 |
| conversion function | +1 | +2 | −1 | −2 | +1 | +2 | −1 | −2 |
| I.D. number | 0 | 2 | 0 | 0 | 4 | 6 | 4 | 4 |

By knowledge of only the I.D. number and the conversion function, a person can convert the I.D. number into the credit card number portion 28. Of course, a wide variety of different formulas are available which enable conversion from credit card to I.D. number and then in reverse, with the credit card portion being sufficient to enable locating the parents of a lost child.

FIG. 7 illustrates another embodiment of the invention, wherein the tag 10A includes the same information as a tag 10 of FIG. 1, but is on a strip of plastic located within a hidden inner pocket 70 within the regular back pocket 72 on a child's pair of pants. The two sides of the pocket are held together by a Velcro, or hook end loop, fastener pair 74. Although this arrangement is of somewhat greater cost, it facilitates the emplacement of the tag and the removal of the tag by authorities when they call the central station and transmit a child's I.D. number.

FIG. 8 illustrates a child's shirt 80 wherein the tag 10 is bonded to the inside of the shirt at the back thereof. A strip of tape 82 with an alert marking 84 is attached to the outer surface of the back of the shirt, to indicate the presence and location of a child identification tag.

Thus, the invention provides a system for aiding in the identification of a lost child. The system includes a tag with an alphanumeric identification marking located on a child's item of clothing, with the I.D. marking being unique to the particular child (or children of a parent) but having no easily observed relationship to the name of the child or of his parents. The tag can also include a telephone number to use for calling a central station (that may be a station in a particular part of a city or which covers an entire country). A computer or other means for generating information to telephone a parent of a child from the I.D. marking is accessible from the central station, either because the computer is located at the central station or the central station has access to the location where the computer is. The item of clothing can also include an alert marking which is viewable by another person when the child is wearing the item of clothing, that indicates that an I.D. marking is on the item of clothing, and which can also indicate where the I.D. marking is located.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A system based on the credit card number of a parent and a central station having access to information about credit card holders, for aiding in the identification of a child of the parent, if the child should become lost, by the marking of an item of clothing of that child, comprising:

reverse conversion means for generating information about a parent of a child from an identification marking on an item of clothing worn by the child;

means for generating an alphanumeric identification marking, or I.D. marking, from a credit card number of the parent of the child, where the I.D. marking is different enough from the credit card number that a person aware of the I.D. marking cannot determine the credit card number without said reverse conversion means, but where at least a portion of the credit card number can be derived from said I.D. marking with the aid of said reverse conversion means;

a tag which includes said I.D. marking, located on said item of clothing which is worn by said child;

a central station;

said tag also includes a telephone number to call to reach said central station;

said reverse conversion means being accessible from said central station for generating, from said I.D. marking, information for communicating with a parent of said child;

said means accessible from said central station include means for generating signals representing at least a portion of a credit card number, of a parent of the child.

2. A system for aiding in the identification of a lost child, by the marking of an item of clothing of that child, comprising:

a tag which includes an alphanumeric identification marking, or I.D. marking, located on that child's item of clothing;

said I.D. marking being unique to the particular child who is intended to wear the item of clothing, but having no easily observed relationship to the name of the child;

a central station said tag also includes a telephone number to call to reach said central station; and means accessible from said central station for generating, from said I.D. marking, information for communicating with a parent of said child;

said tag being positioned in a hidden location on the item of clothing; and including an alert marking on said item of clothing, said alert marking having pointer means that points to the location of said tag.

* * * * *